United States Patent [19]

Ratto

[11] 4,369,634
[45] Jan. 25, 1983

[54] FUEL-FLOW MONITOR AND AUTOMATIC AIR-COMPRESSOR CUT-OFF

[76] Inventor: Howard Ratto, 811 Fire Island Ave., West Islip, N.Y. 11795

[21] Appl. No.: 223,790

[22] Filed: Jan. 9, 1981

Related U.S. Application Data

[63] Continuation-in-part of Ser. No. 140,310, Apr. 14, 1980, abandoned.

[51] Int. Cl.³ .................... F25B 49/00; B60Q 1/00
[52] U.S. Cl. .................................. 62/126; 62/133; 340/52 R; 200/81.4
[58] Field of Search ................ 62/126, 133, 323.4; 340/52 R; 200/81.4

[56] References Cited

U.S. PATENT DOCUMENTS 3,606,764 9/1971 Yokouchi et al. .............. 200/81.4
4,269,033 5/1981 Birch .............................. 62/133

*Primary Examiner*—William E. Wayner
*Attorney, Agent, or Firm*—Bauer & Amer

[57] ABSTRACT

A presettable fuel-flow monitor and automatic air compressor cut-off for a motor vehicle alerts the driver to inefficient vehicle operation, and during such operation, cuts off the air conditioner. A Bourdon tube is operatively connected to engine vacuum and is adapted to move in response thereto. A switch contact, adapted to be activated on a given displacement of the Bourdon tube, is positioned a preset distance from the Bourdon tube. A secondary switch, in series circuit with the air conditioner switch, is normally closed and applies electrical power to the magnetic clutch for air conditioner operation. An alarm or signal, consisting of either a light, or audible means, or both, is connected to electrical power through the switch contact. When changes in engine vacuum cause the Bourdon tube to move a preset distance, the tube operates the secondary switch opening same thus cutting off the air compressor. Thereafter, the tube engages the switch contact to apply power to the alarm. The trip point for cutting off the air conditioner and turning on the alarm can be "fine-tuned" to suit a variety of engine vacuum efficiencies, vehicle weights, and individual driving habits.

11 Claims, 5 Drawing Figures

FUEL-FLOW MONITOR AND AUTOMATIC AIR-COMPRESSOR CUT-OFF

This application is a continuation-in-part of my earlier filed co-pending application, Ser. No. 06/140,310, filed Apr. 14, 1980, now abandoned and incorporates herein by reference all of the subject matter of said aforesaid co-pending patent application.

This invention relates to a vacuum operated device that automatically and memontarily cuts off the air conditioner compressor when maximum engine power is required, and that indicates excessive fuel consumption by either visual means or audible means, or both.

As mentioned in the above-noted co-pending application, it has been estimated that a driver can improve vehicle fuel economy by up to 20 percent simply by practicing fuel-efficient driving techniques. It is known that generally, intake-manifold vacuum has a correlation to fuel consumption. Thus, when manifold vacuum is high, fuel consumption is low, and when manifold vacuum is low, as it is during rapid acceleration, fuel consumption is high. Hence, for this reason, many devices are used to indicate fuel economy, monitor manifold vacuum.

Basically, there are three types of in-car vacuum gauges that are popularly in use, namely, dial, indicator-light, and piston. The dial gauge displays manifold vacuum by a movable pointer that indicates the amount of vacuum in relative terms such as poor, fair, and good, or, by use of such terms as "power" and "economy." The indicator-light vacuum operated device displays vacuum level by discrete lights. In the piston gauge, a marked or colored piston moves relatively to a housing in response to vacuum. Different colors or markings on the piston correspond to various levels of engine vacuum. However, with each of the aforenoted devices, the driver must continuously watch the vacuum device. This distracts the attention of the driver from the task of driving and becomes an obvious safety hazard. Moreover, since usually it is the gross excursions of manifold vacuum that correlate to high fuel consumption, minor deviations of manifold vacuum are not, generally, of utmost importance. Hence, it is desirable to employ a "passive" device that will activate and signal on a preset excursion of manifold vacuum, i.e., poor fuel consumption.

Then, too, it is well known that, in air conditioned cars, the air compressor requires a considerable amount of power for its operation. When the air conditioner is on and the compressor operating, the compressor load or drag is applied to the engine at all times. In certain situations, such as passing and for quick acceleration, full engine power may be needed. Hence, when passing and for safety, it would be desirable to cut-off the air conditioner compressor automatically and momentarily.

In general, the present invention utilizes a device responsive to changes in engine vacuum, as a Bourdon vacuum tube that is coupled to the intake manifold of the engine. Such vacuum responsive device as the Bourdon tube exhibits a displacement that corresponds directly with and to changes in engine manifold vacuum during vehicle operation. For operation of the signalling apparatus, an adjustable switch contact, through which B+ is applied, is adapted to become engaged with the vacuum responsive device as the Bourdon tube when manifold vacuum displaces this tube a preset amount. When a given change of manifold vacuum causes the Bourdon tube to expand and engage the switch contact, electrical power is applied to either a light, or a buzzer, or both, alerting the driver to inefficient vehicle operation and high fuel consumption.

For operation of the automatic and momentary air conditioner cut-off, a secondary switch, set a preset distance from the responsive device contact, as the Bourdon tube, is momentarily opened by the Bourdon tube when the tube is displaced or radially expands a preset amount. Owing to the fact that the secondary switch normally applies B+ or battery voltage to the magnetic clutch of the compressor, the radial expansion of the Bourdon tube of the responsive device opens the circuit to the magnetic clutch momentarily deactivating same. When engine vacuum returns to its normal or cruising value, radial contraction of the Bourdon tube forces the tube contact to engage the secondary switch whereupon the last-mentioned switch applies B+ to the magnetic clutch turning the air compressor on.

The vacuum responsive device, as the Bourdon tube and related electrical hardware can be conveniently packaged in a small unit that can be attached to the vehicle dashboard.

It is, therefore, an object of the present invention to provide a device that indicates an excessive rate of fuel consumption, and that automatically and momentarily cuts-off or locks-out the air compressor during hard acceleration.

It is another object of the present invention to provide an add-on device to an existing auto which provides a positive indication when the vehicle is being driven inefficiently.

It is a further object of the present invention to provide a teaching aid for fuel conservation wherein the device remains inoperative until a preset rate of fuel consumption is achieved, provides a signal or alarm while the preset rate is being exceeded, and returns to an "off" state under fuel efficient operation.

It is a still further object of the present invention to provide an adjustable, presettable, fuel-flow monitor that employes a vacuum responsive device, as a conventional Bourdon tube which automatically and momentarily cuts-off the air compressor, and that utilizes this tube as a contact to complete a circuit through either visual means, or audible means, or both, when a preset rate of fuel flow is exceeded.

Other objects and features of the present invention will become apparent from the following detailed description considered in connection with the accompanying drawings. It is understood, however, that the drawings are designed for purposes of illustration only, and not as a definition of the limits of the invention for which reference should be made to the appending claims.

In the drawings, wherein the same reference numeral denotes the same element throughout the several views.

Figure 1:
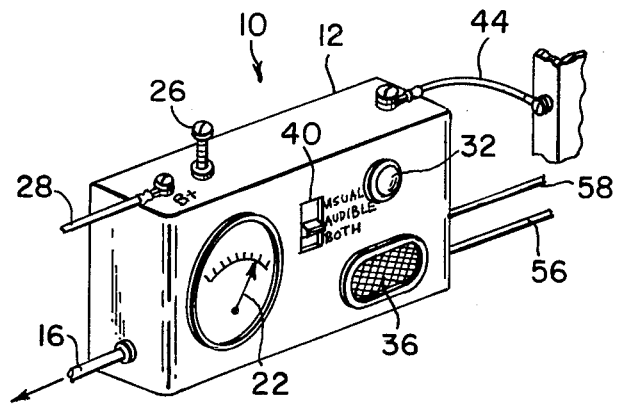
FIG. 1 is a perspective view of the inventive device as packaged and adapted to be mounted conveniently on the dashboard of a vehicle.

In detail now and referring to FIGS. 1 through 4, the inventive fuel-flow monitor and automatic air compressor cut-off is indicated generally by reference numeral 10, and it comprises a housing 12 that is adapted to be attached anywhere in the passenger compartment of an automobile. Typically, housing 12 is attached to the dashboard by means such as Velcro, pressure sensitive tape, screws, or the like. Preferably, housing 12 is placed on the dashboard at a location wherein the same is within the direct or peripheral vision of the driver. Disposed within housing 12 is a metallic and thus an electrically conductive vacuum responsive device 14. Although other devices are applicable, for convenience of explanation and understanding a Bourdon tube has been illustrated. The use and illustration of a Bourdon tube should not be deemed a limitation upon the scope of the invention.

The Bourdon tube 14 is disposed within housing 12 so that the tube and housing electrically are insulated. Bourdon tube 14 includes an integral, dielectric or nonconductive extension 16, the free end of which is connected to any convenient part of the engine vacuum system, as at the intake manifold 18 of engine 20, as shown. Preferably, the vacuum responsive device or Bourdon tube 14 includes a dial or pointer, and linkage hardware 22. Dial 22 is disposed on an outside face of housing 12 so that the same can be seen by the driver.

An adjustable electrically conductive contact 24, defined by a free end or contact edge 24a and a fixed or pivot end 24b, is disposed within housing 12. Contact 24 and hence end 24b is biased in such manner as to be spaced from the tube 14. A screw or adjustment means 26 threadably engages one wall of housing 12 thereby to dispose one end of screw 26 inwardly of housing 12 and in pressured, albeit adjustable engagement with contact 24. The inboard end or tip of screw 26 is adjusted into engagement with contact 24 thereby to place contact edge 24a adjacent to and preselectively spaced from the outwardly facing rim or perimeter of tube 14. Preferably, screw 26 is comprised of nylon or some such dielectric material to ensure that means 26 remains insulated from housing 12 in event that the housing is comprised of metal. Moreover, fabricating screw 26 from nonconducting stock prevents an inadvertent grounding of same to the vehicle chassis. A B+ or battery-positive lead 28 electrically couples contact 24 to the positive terminal of ignition coil 30.

Included within housing 10 are signal means that include a light bulb or light source 32 and a buzzer or audible alarm 34. The bulb portion of source 32 protrudes from the front face of housing 12. Owing to the aforesaid location of housing 12 within the vehicle, and during operation of the invention as will be described below, the driver will be visually alerted to an excessive rate of fuel consumption when the bulb is turned on. An aperture or grill 36 is disposed through a wall of housing 12 and positioned near audible means 34. Electrically, one side of light source 32 and buzzer 34 are tied to chassis ground by means of a lead 44. The other side of the light source and buzzer, indicated respectively as leads 38a and 38b, electrically are connected to respective terminals of a three-position slide switch 40 in a manner more fully described below. A lead 42 electrically couples metallic Bourdon tube 14 with the wafer or moving contact 40a of switch 40.

A dielectric or nonconducting plate 50 is placed within housing 12 and adjacent to tube 14. A selectively adjustable, electrically conductive contact pad 52 is supported on dielectric plate 50 in the following manner. A threaded aperture 51 is disposed in plate 50. A screw or stud 53 formed with slotted head 53a interferingly threads into aperture 51. The free end of stud 53 that threads into and through aperture 51 is attached to and supports conductive contact pad 52, as shown.

Figure 2:
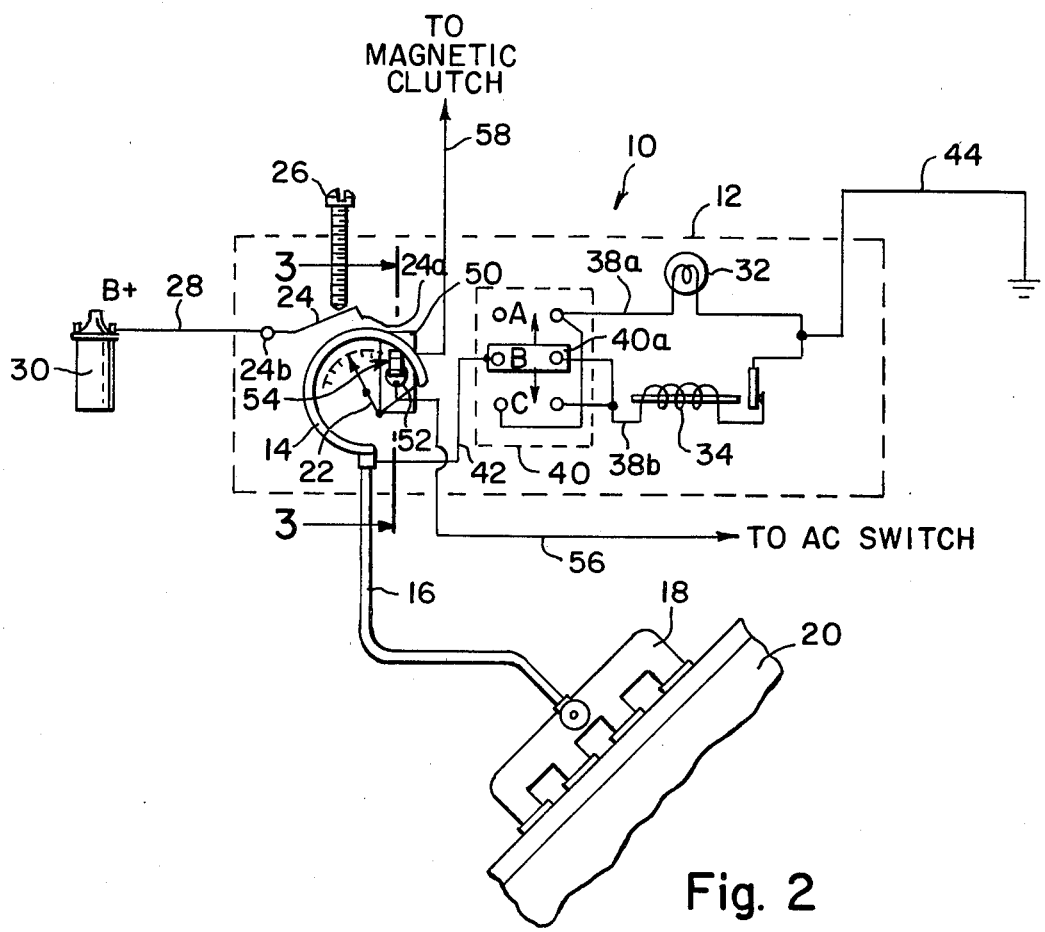
FIG. 2 is a diagrammatic view showing the electrical circuit and mechanical connection of the fuel-flow monitor and automatic air compressor cut-off shown in FIG. 1.
Figures 3, 4:
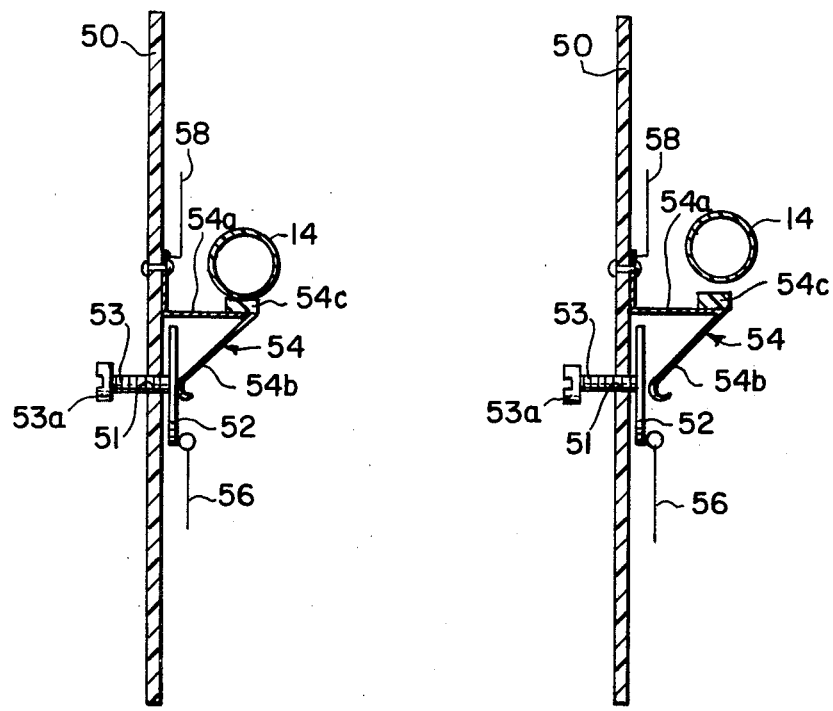
FIG. 3 is a view taken along the line 3—3 of FIG. 2 and drawn on an enlarged scale to reveal the construction of the switch means used to disable the air compressor momentarily.
FIG. 4 is a view similar to FIG. 3 showing the switch opening the circuit to the magnetic clutch to cut-off air compressor operation.

An electrically conductive and resilient contact finger 54 has one end pinned to plate 50. As seen in FIGS. 2, 3 and 4, contact finger 54 is formed with a cantilever shelflike portion 54a from which depends an arcuate contact portion 54b. Thus, the free end of contact finger 54, that is, end 54b, is, more or less, bent back upon cantilever portion 54a and depends in angulated disposition therefrom. A nonconducting strike platform 54c is attached to the outboard or upwardly facing surface of shelf 54a. One end of an electrical lead 56, this end not shown, is connected to the air conditioner switch. The other end of lead 56 is electrically coupled to contact plate 52. One end of an electrical lead 58, this end now shown, is connected to the magnetic clutch of the air compressor. The other end of lead 58 is electrically connected to that end of finger 54 that is pinned to plate 50.

The position of plate 50 and the selected adjustment or position of stud 53 relative to the last-mentioned plate is such that during cruising, i.e., periods of high vacuum, tube 14 engages platform 54c driving finger part 54b into a pressured engagement with contact pad 52 thus completing the circuit between lines 56 and 58. During operation of the invention as will be described below and as Bourdon tube 14 radially uncoils, as it were, during hard acceleration, the tube comes out of pressure engagement with strike platform 54c causing resilient finger portion 54b to separate from adjustable pad 52 opening the circuit to magnetic clutch line 58.

As is apparent from FIG. 2, when switch contact 40a is in position 'A,' tube 14 is in electrical circuit with light 32 only. When switch contact 40a is in position 'B,' tube 14 is in electrical circuit with buzzer 34 only. And, when switch contact 40a is in position 'C,' switch contact 40a is in electrical circuit with light source 32 and buzzer 34 and is operable to apply power concomitantly to both.

In the operation and use of fuel-flow monitor and automatic air compressor cut-off 10, Bourdon tube 14 continually monitors engine vacuum in manifold 18 by means of vacuum line 16. During idling and under normal driving conditions, engine vacuum is high causing an inward radial contraction of tube 14. Under these conditions and as depicted in FIGS. 2 and 3, tube 14 engages dielectric platform 54c and thus drives finger part 54b against contact pad 52. This completes the circuit through lines 56 and 58 thus applying electrical energy to the magnetic clutch of the air conditioner. It should be apparent that during the cited condition of high engine vacuum, line 42 receives no electrical power and thus the signalling apparatus is out of electrical circuit with the ignition switch or battery side of the ignition coil.

Changes in manifold vacuum due to throttle movement, as when accelerating or passing, cause movement or radial expansion of tube 14. Depending on the position of contact 24a relative to the perimeter of tube 14, selected finite excursions or changes of manifold vacuum of the engine will cause tube 14 to expand and engage contact edge 24a depending upon the space therebetween as preset by the adjustment of the screw 26. Furthermore, as tube 14 expands, it comes out of pressured contact with insulated platform 54c allowing finger part 54b to separate from the selectively adjusted contact pad 52 thus opening the circuit between leads 56 and 58, as shown in FIG. 4. When this happens, power to the magnetic clutch ceases and the load or drag on the engine caused by the air compressor is temporarily removed. As tube 14 engages contact 24a, electrical power is applied to line 42 to complete the circuit through the signal means consisting of light 32, or buzzer 34, or both, turning the same on, depending on whether switch 40 is in respective position 'A,', 'B,' or 'C.'

Hence, once engine vacuum drops to a preset level, as devined by the preset space between the tube 14 and contact 24a, and while it is at this level, a switch-selectable signal activates and the air compressor is shut off. As manifold vacuum increases, normally indicating a decrease in vehicle acceleration, and thus a decrease in excessive fuel consumption, tube 14 will move radially inwardly and come out of engagement or out of electrical contact with edge 24a. The opening of the circuit between the perimeter tube 14 and edge 24a will terminate the signal caused by either light 32 or buzzer 34, or both. As tube 14 coils radially inwardly, it once again engages dielectric pad 54c driving finger part 54b into contact with pad 52 thus to complete the circuit through leads 56 and 58. This restores power to the magnetic switch and turns the air compressor back on.

Of course, it will be apparent that edge 24a of contact 24 can be selectively adjusted and placed "so close", as it were, to tube 14 that even relatively minor vacuum changes corresponding to mild and relatively fuel-efficient accelerations will cause activation of either light 32 or buzzer 34, or both, depending on the setting of switch 40. Hence, the adjusted or selected spacing of edge 24a from tube 14 is normally set so as to permit the signalling to occur only upon the occurrence of gross changes in vacuum thereby to avoid continual signalling in stop and go traffic. And, in like manner, contact pad 52 is placed into pressured contact with finger 54b by the adjustment of stud 53 relative to plate 50 so that finger 54b separates from contact pad 52 only during a gross excursion of manifold vacuum as normally would occur during hard acceleration.

Figure 5:
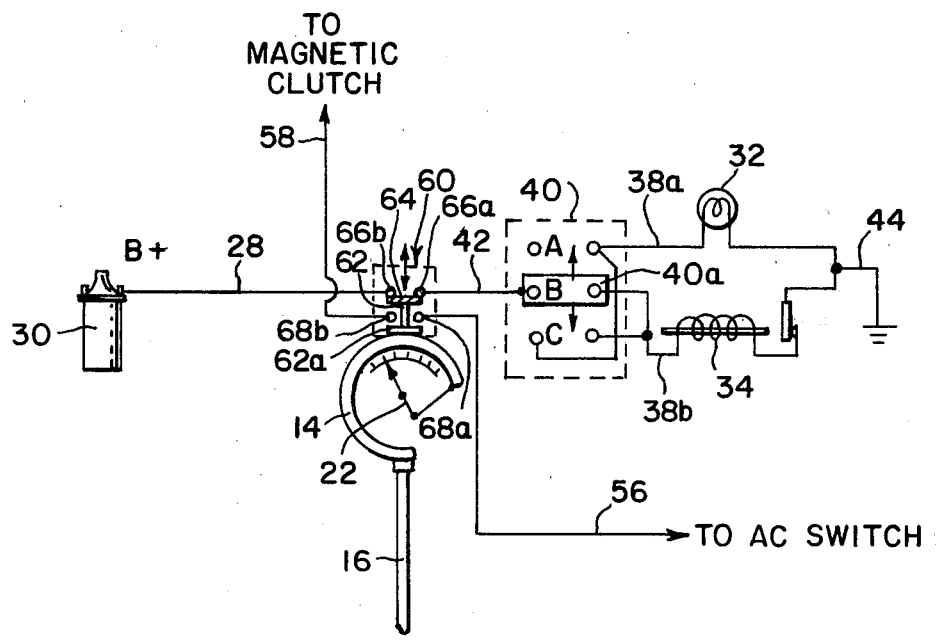
FIG. 5 is a diagrammatic view showing the electrical circuit and mechanical connection of another switch construction comprising the inventive device.

Turning now to FIG. 5 there is shown another embodiment of the inventive fuel-flow monitor and automatic air compressor cut-off. A switch mechanism, indicated generally by reference numeral 60, is positioned adjacent to, and in working relation with, Bourdon tube 14. Mechanism 60 includes a dielectric or nonconductive plunger 62. One end of plunger 62 is formed with a foot 62a that rides on tube 14 as shown. The other end of plunger 62 fixedly carries an electrically conductive contact plate 64. A first pair of switch contacts or poles, namely, contacts 66a and 66b, are operatively placed in switch mechanism 60.

One end of lead 42 is connected to pole 66a. The other end of lead 42 is connected to switch 40 in the manner similar to that shown and described in FIG. 2. A battery or ignition switch line 28 is connected to pole 66b. Contacts 66a and 66b are adapted to be engaged concomitantly by plate 64 thus to complete the circuit therethrough when the plate is driven into such contact by operation of plunger 62, to be described below. A second pair of switch contacts or poles, namely, contacts 68a and 68b, are operatively placed in switch mechanism 60 in spaced operative relation from contacts 66a and 66b.

As seen in FIG. 4, contacts 68a and 68b are placed, more or less, under contacts 66a and 66b whereby both set of contacts, that is, contacts 66a and 66b, and contacts 68a and 68b, are in an operative relation with the throw of contact plate 64. One end of lead 56 is connected to pole 68a, and one end of lead 58 is connected to pole 68b. As plunger 62 moves in response to radial displacements of tube 14, power is applied to or interrupted from the magnetic clutch or signal means during operation of the embodiment of FIG. 5 as will be described now.

Operation and use of the embodiment of FIG. 5 is straightforward. As Bourdon tube 14 moves or radially uncoils in response to engine vacuum in line 16, it pushes or drives foot 62a which, in turn, affects movement of plunger 62 relative to the aforementioned contacts or poles. As plunger 62 moves vertically, viewing FIG. 5, it brings with it plate 64. Plate 64 completes either the circuit through poles 66a and 66b, or poles 68a and 68b, but not both. Being more specific, during idling and normal cruising, Bourdon tube 14 coils radially inwardly. This causes the plunger 62, carrying with it contact plate 64, to move relatively downwardly causing plate 64 concomitantly to engage poles or contacts 68a and 68b to complete the circuit to the magnetic clutch of the air compressor, turning same on.

It will be apparent that as contact plate 64 comes to rest on contacts 68a and 68b, the circuit through contacts 66a and 66b, and thus line 42 to the fuel-flow alarm circuit is open, so to speak. When the throttle is opened rapidly, as it is during hard acceleration, tube 14 expands radially outwardly or uncoils to some degree. The outward expansion of tube 14 drives plunger 62 relatively upwardly, when viewing FIG. 5, lifting contact plate 64 off of contacts 68a and 68b and onto contacts 66a and 66b. As plate 64 concomitantly engages poles 66a and 66b, it completes the circuit through these contacts and applies electrical power to switch 40 to provide power to either light 32 or buzzer 34, or both, depending on the position of switch 40 as noted above.

As plate 64 moves off of contacts 68a and 68b, it opens the circuit to the magnetic clutch cutting off operation of the air conditioner. When the vacuum in line 16 reaches its normal cruising value, tube 14 again coils radially inwardly causing a downward displacement of plunger 62. Downward movement of plunger 62 and plate 64 opens the circuit between contacts 66a and 66b opening the circuit to switch 40 and shutting off the selected alarm. As plunger 62 and plate 64 continue their relative downward displacement, plate 64 once again concomitantly engages contacts 68a and 68b thus completing the circuit to the magnetic clutch to resume air compressor operation.

In the foregoing embodiments and to prevent unwanted interruption of power to the air compressor, switch plate 50 in the embodiment of FIGS. 1 through 4, and switch assembly 60 in the embodiment of FIG. 5, are each operatively placed in relation to tube 14 so that the respective circuits of these embodiments are broken only during hard acceleration, i.e., during large drops in engine vacuum. This will prevent a noticeable loss in air conditioner operation during normal driving and in stop-and-go traffic.

Once set properly, the signalling circuit of the inventive device remains relatively passive, although in an armed state. The inventive device will trigger the light or buzzer, or both, and interrupt electrical power to the magnetic clutch only on a preset drop in manifold vacuum. When engine vacuum returns to a fuel efficient or cruising state, the visual or audible signal terminates automatically owing to the opening of the circuit to these means by operation of tube 14, and the air compressor resumes normal operation owing to the closing circuit to the magnetic clutch by the same operation of tube 14.

The precise adjustment afforded by set screw 26, contact pad 52, or switch mechanism 60 allows a correspondingly precise setting of the "trip" point of the inventive device. The selective adjustment of the pad 52 may be performed conveniently by the driver by positioning the adjustment slement 53, in the form of a knob, at the vehicle dashboard. By this arrangement, the driver may select the range of vacuum during which the air conditioner is to operate, as well as its length or period of operation during the excursions of movement performed by the tube 14. Hence, the inventive means can be fine tuned to a given vehicle weight, engine vacuum efficiency, and operator driving habits. And, the switch-selectable signalling means of the instant monitor allows the driver to fix his concentration on the road totally and without distraction, yet be reminded constantly of inefficient vehicle operation.

While only a few embodiments of the present invention have been shown and described, it is to be understood that many changes and modifications can be made hereto without departing from the spirit and scope hereof.

What is claimed is:

1. A fuel-flow monitor and automatic air compressor cut-off comprising a vacuum responsive means operatively connected to the vacuum of an engine and displaceable in response to changes in the engine vacuum, first switch means spaced from and acapted to be activated by a given displacement of said responsive means, signal means electrically connected with said first switch means, second switch means in electrical circuit with the magnetic clutch of the air compressor, said second switch means being normally closed and adapted to be operated by said responsive means upon a given displacement of same, and means for independently adjusting the position of said first and second switch means relative to said responsive means so that when changes in engine vacuum cause said displacements of said responsive means, a defined movement of said responsive means operates said second switch means opening same to terminate electrical power to the magnetic clutch and operates said first switch means to apply power to said signal means to indicate that the engine is being operated inefficiently.

2. The monitor and automatic air compressor cut-off as in claim 1, said vacuum responsive means being a Bourdon tube in which said tube is displaceable in response to changes in engine vacuum.

3. The monitor and automatic air compressor cut-off of claim 2, said signal means including light source means, audible means, and three position switch means, said light source means and audible means each being connected through said three position switch means so that the operator can select either said light source means, or said audible means, or both, to enable him to be audibly or visually warned of inefficient vehicle operation.

4. The monitor and automatic air compressor cut-off of claim 3, said adjustment means for said first switch means including a screw one end of which is adapted to adjust the position said first switch means relative to said Bourdon tube, said adjustment means for said second switch means including a screw adapted to adjust the position of said second switch means relative to said Bourdon tube.

5. A fuel-flow monitor and automatic air conditioner cut-off adapted to provide a signal on a preset rate of fuel consumption of an engine comprising an electrically conductive means through which flows electrical power to the magnetic clutch and which is operatively connected to the engine vacuum and adapted to move in response thereto, a switch contact positioned spaced from and adjacent to said conductive means and adapted to be engaged and contacted thereby, said switch contact being electrically coupled to a source of electricity, a secondary switch in electrical circuit with the air conditioner switch and placed adjacent to said conductive means and adapted to be operated thereby such that when the air conditioner switch is turned on and engine vacuum assumes its cruising value, said conductive means causes said secondary switch to complete the circuit to the magnetic clutch, means for selective adjustment of said switch contact relative to said conductive means to preselect the relative space therebetween, and electrically activated signal means electrically connected to said conductive means so that when said conductive means is displaced a preset amount, it operates said secondary switch opening the circuit to the magnetic clutch cutting off the air compressor, and it engages said switch contact to apply power to said signal means to alert the operator of inefficient vehicle operation.

6. A fuel-flow monitor and automatic air compressor cut-off of claim 5, said secondary switch including a nonconductive switch plate, an adjustable contact pad carried on said switch plate, and an electrically conductive finger extending from said switch plate, said finger including a nonconductive strike platform adapted to engage said conductive means during periods of high vacuum whereupon said finger is driven onto said pad thus to complete the circuit to the magnetic clutch, said signal means including light source means and audible means, and three position switch means, said light source means and audible means each being connected to said three position switch means in such manner whereupon the operator can select either said light source means or audible means, or both.

7. A fuel-flow monitor and automatic air compressor cut-off of claim 6, said secondary switch including a screw threadably received in said switch plate, the free end of said screw carrying said contact pad and presettably positioning same for engagement with said finger during periods of engine vacuum.

8. A fuel-flow monitor and automatic air compressor cut-off of claim 7, said conductive means being a displaceable Bourdon tube.

9. A presettable fuel-flow monitor and automatic air conditioner cut-off adapted for use as an automotive teaching aid including in combination a housing, a vacuum responsive means disposed within said housing and being operatively coupled to the vacuum system of the automotive engine to move in response thereto, a switch mechanism disposed within said housing, said switch mechanism adapted to be operated by movement of said vacuum responsive means and including a first set of contacts and a second set of contacts, signal means, said signal means being electrically connected to one side of said first set of contacts, the other side of said first set of contacts being electrically connected to battery power, one side of said second set of contacts being electrically connected to the air conditioner switch line, the other side of said second set of switch contacts being electrically connected to the magnetic clutch of the air compressor, the operation of said switch mechanism being such so that during the time engine vacuum is at its normal cruising value, said first set of contacts are open turning off electrical power to said signal means and said second set of contacts are closed completing the circuit to the magnetic clutch, whereupon a drop in engine vacuum causes said vacuum responsive means to move, and upon a preset movement of said vacuum responsive means the same causes operation of said switch mechanism whereby said second set of contacts opens cutting off electrical power to the magnetic clutch and said first set of switch contacts are closed applying electrical power to said signal means to alert the operator to inefficient vehicle operation.

10. A resettable fuel-flow monitor and automatic air conditioner cut-off of claim 9, said switch mechanism including a plunger one end of which is adapted to move in response to movements of said vacuum responsive means, the other end of said plunger carrying a contact plate, said contact plate being adapted to move between said first set of contacts and said second set of contacts thus alternately to complete the respective circuits therethrough, and means for positioning said switch mechanism relative to said vacuum responsive means to permit the respective circuits to be opened or closed upon a given displacement of said vacuum responsive means.

11. A resettable fuel-flow monitor and automatic air conditioner cut-off of claim 10, said vacuum responsive means being a displaceable Bourdon tube.

* * * * *